United States Patent [19]
Toriyama et al.

[11] 3,966,631
[45] June 29, 1976

[54] NEMATIC LIQUID CRYSTAL COMPOSITION

[75] Inventors: Kazuhisa Toriyama, Hitachi; Hidetoshi Abe, Katsuta; Fumio Nakano, Hitachi; Kenji Murao, Hitachi; Mikio Sato, Hitachi, all of Japan

[73] Assignee: Hitachi, Ltd., Japan

[22] Filed: Aug. 8, 1974

[21] Appl. No.: 495,768

[30] Foreign Application Priority Data
Aug. 15, 1973  Japan.................................. 48-9089

[52] U.S. Cl............................ 252/299; 350/160 LC
[51] Int. Cl.² ....................... G02F 1/16; C09K 3/34
[58] Field of Search................... 252/299, 408 LC; 350/160 LC, 150

[56] References Cited
UNITED STATES PATENTS

| 3,499,112 | 3/1970 | Heilmeier et al. ................ 252/299 |
| 3,656,834 | 4/1972 | Haller et al. .................... 252/408 LC |
| 3,675,987 | 7/1972 | Rafuse ............................. 252/299 |
| 3,698,449 | 10/1972 | Sorkin et al. .................... 350/150 X |
| 3,803,050 | 4/1974 | Haas et al. ...................... 252/408 LC |
| 3,809,456 | 5/1974 | Goldmacher et al. ........ 252/408 LC |
| 3,838,059 | 9/1974 | Wong................................. 252/299 |
| 3,888,566 | 6/1975 | Toriyama et al.................... 252/299 |
| 3,904,797 | 9/1975 | Jones, Jr. et al.............. 252/408 LC |

OTHER PUBLICATIONS

Creagh, L. et al., J. Elect. Materials, vol. 1, pp. 350–354 (1972).
Creagh, L., Proc. IEEE, vol. 61, No. 7, pp. 814–821 (7/1973).

Primary Examiner—Benjamin R. Padgett
Assistant Examiner—T. S. Gron
Attorney, Agent, or Firm—Craig & Antonelli

[57] ABSTRACT

A nematic liquid crystal composition having an improved response to a pulsating driving voltage for effecting a dynamic scattering mode which comprises a predominant amount of a nematic liquid crytal having properties of the dynamic scattering mode and 0.001 to 3% by weight of an onium halide salt having a nitrogen atom as a nucleus, the composition further containing a phenolic compound for improving the solubility of the onium halide salt in the lqiuid crystal and assisting in increasing the degree of dissociation of the neutral onium halide salt to ions.

7 Claims, 7 Drawing Figures

○: SELECTED SEGMENTS

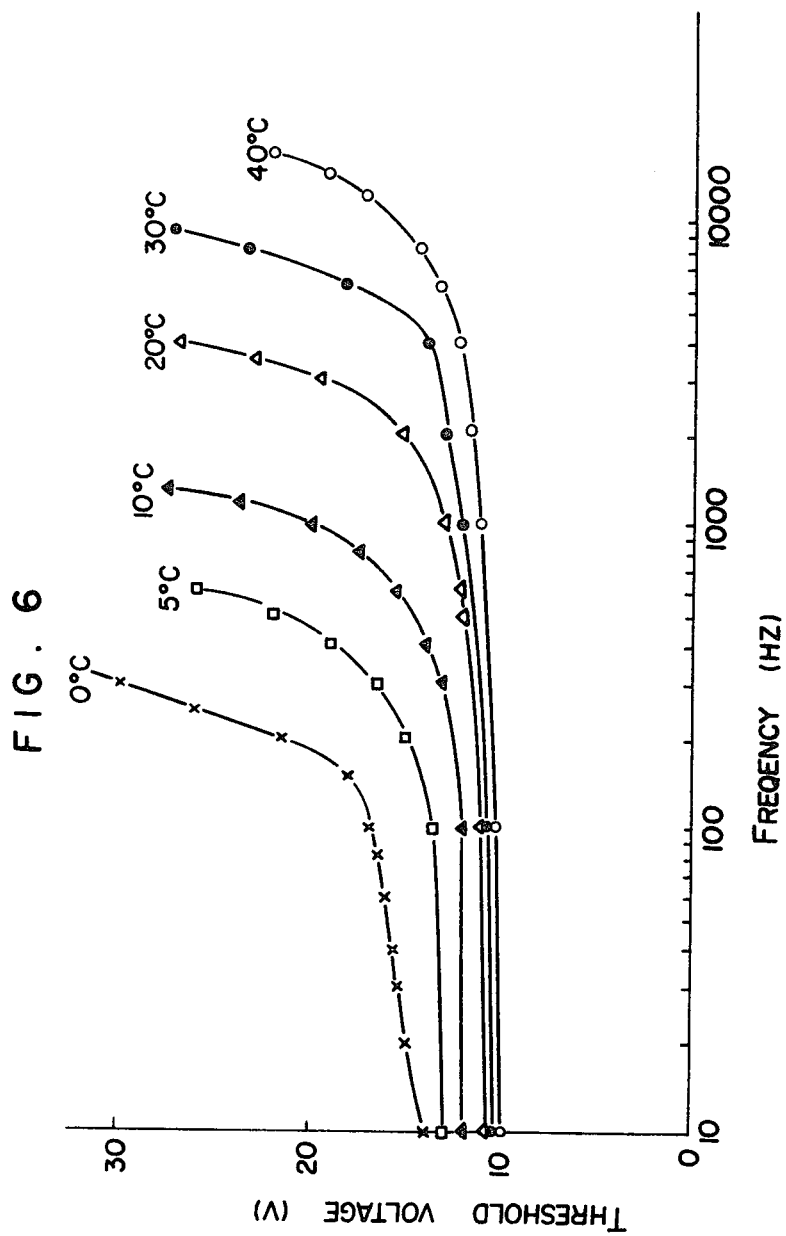

NEMATIC LIQUID CRYSTAL COMPOSITION

This invention relates to a nematic liquid crystal composition having such characteristics as an improved response to driving voltage for effecting the dynamic scattering mode, and more particularly to a nematic liquid crystal composition suitable for a matrix liquid crystal display device based on a time-sharing or multiplexing driving system.

Low power consumption and low voltage actuation of liquid crystals have been regarded as highly important, and liquid crystals are going to be practically utilized as display devices for table-type electronic computors, watches, etc. For expansion of their fields of application, it is necessary to carry out the matrix display on the basis of a multiplexing driving system. In that case, an increase in response and prevention of crosstalks due to matrix address are important objects.

To attain these objects, several attempts have been so far made, for example, by electrically orienting the liquid crystals in one direction by a combination of non-linear elements such as diode, FET, etc. [B. J. Lechner : Liquid crystal matrix displays, Proc. IEEE 59 (1971) 1566] or by making threshold values definite by laminating the liquid crystals with a highly dielectric material [J. G. Grahmair et al: Liquid crystal matrix displays using additional solid layers for suppression of parasite current, Mod. Liq. Cryst. 15 (1971) 95]. Furthermore, a two-frequency driving system has been proposed, where low frequency signals are applied to selected points, and high frequency signals to semi-selected points [C. R. Stein et al: A two-frequency coincidence addressing scheme for nematic liquid crystal display, Appl. Phys. Letters, 19 (1971) 343]. It has been pointed that these prior arts are not satisfactory in contrast and driving voltage. On the other hand, Kawakami et al disclosed that the multiplexing driving could be carried out at a low voltage with a high contrast but no cross-talks by a practical alternating current driving system, that is, the so-called voltage-averaging method [A multiplexing driving system for a liquid crystal device, Materials for the research conference on image display systems, Television Institute, 11-2 (1973)]. It is necessary that the liquid crystals used in the system shows a sharp threshold value, and the threshold value should be as low as possible.

It is necessary that the liquid crystal compositions, which can undergo the multiplexing driving, have such a characteristic that they can be driven at a low voltage with a short pulse width. Molecular orientation of nematic liquid crystals is gradually disturbed by repeatedly applying to the nematic liquid crystals a voltage with a shorter pulse width than the time at which the molecular orientation starts to be disturbed by the applied electric field, that is, the so called rise time, at constant periodic intervals. By utilizing such an accumulative phenomenon of the liquid crystal towards the electric field, the multiplexing driving can be carried out. That is, the multiplexing driving of matrix type elements having many displayable numbers of lines can be carried out thereby. The displayable number of lines is proportional to the applied voltage. Generally, the applied voltage must be elevated to increase the displayable number of lines. Furthermore, the rise voltage for the multiplexing driving based on such accumulative phenomenon is inevitably elevated, as compared with the rise voltage for the normal driving based on the application of voltage with normal, sufficiently long pulse width. It is obvious from these facts that, if the rise voltage can be lowered, multiplexing driving at a low driving voltage and a matrix display with an increased number of lines will result.

Some of the present inventors have already proposed a nematic liquid crystal composition containing an onium halide salt.

The dynamic scattering mode (DSM) properties of liquid crystals can be improved by mixing nematic liquid crystals with organic onium halide salts having a nitrogen atom as a nucleus such as quaternary ammonium halides, pyridinium halides, isoquinolinium halides or acridinium halides (Electro-optical Device Including an Improved Liquid Crystal Composition, U.S. Application Ser. No. 387,272, filed on Aug. 10, 1973, now U.S. Pat. No. 3,888,566).

However, said liquid crystal composition is not satisfactory in the following points:

1. Since solubility of said onium halide salt in the liquid crystals is small, it is impossible to select freely an additive amount of the onium compound so as to obtain an effect of the addition. Particularly, it is a significant problem that the onium halide salt is liable to precipitate at low temperatures. As a result, the reliability of the liquid crystal display element is lowered.

2. The response to the applied voltage is not satisfactory enough even if said onium halide salt is added to the liquid crystal. One of the reasons for failure to obtain the satisfactory response is the low solubility and low degree of dissociation of the added salt to ions.

An object of the present invention is to provide a liquid crystal composition of high reliability, free from the disadvantages of the above-mentioned liquid crystal composition, which can respond quickly to a voltage of small pulse width capable of effecting multiplexing driving display, show a sharp threshold value in curves of scattered light intensity versus applied voltage, have a low threshold voltage and is free from precipitation of the additive.

The present invention is based on a finding that, when a phenolic compound is added to a system containing a nematic liquid crystal capable of effecting a dynamic scattering effect and an onium halide salt having a nitrogen atom as a nucleus, the onium halide salt can easily be dissolved to assist increasing of the degree of dissociation of the onium halide salt to ions in the liquid crystal, and the resulting composition becomes stabilized over the wide range of the temperatures and has improved electrooptical characteristics.

Other objects and characteristics of the present invention will be apparent from the following detailed description by way of the accompanying drawings.

FIG. 5 is a graph showing relations between threshold voltage and frame frequency with respect to the matrix display device shown in FIG. 4b in accordance with the driving method illustrated in FIG. 4a.

FIG. 6 is a graph showing relations between threshold voltage and frequency with respect to a nematic liquid crystal composition containing no phenolic compound.

Figure 1:
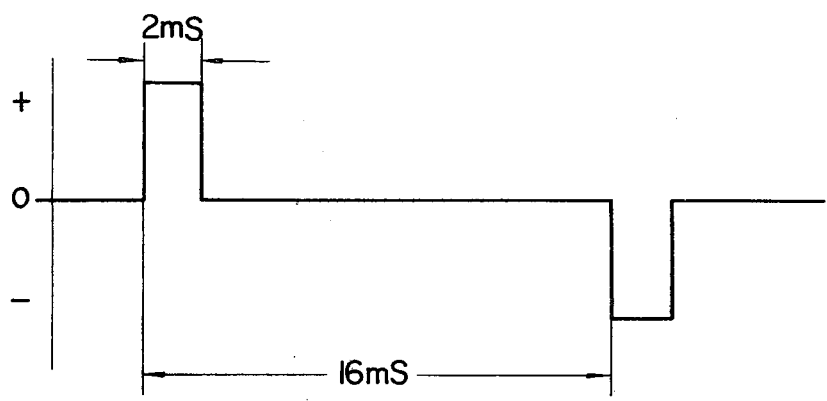
FIG. 1 is a diagram showing a wave form of bi-directional pulse voltage to be applied to a liquid crystal display device.

The nematic liquid crystals used in the present invention are liquid crystal compounds having a negative dielectric anisotropy, which are capable of effecting dynamic scattering, that is, the so-called $N_n$-type liquid crystal compounds in which the direction of dipole moment of the molecule is considerably deviated from the direction of longitudinal axis of the molecule. Since the display device is used under different circumstances, it is necessary that the liquid crystal temperature lies within a considerably broad range around the room temperature. The liquid crystal compounds include, for example, p-methoxybenzylidene-p-n-butylaniline (MBBA), p-ethoxybenzylidene-p-butylaniline (EBBA), p-butoxybenzylidene-p-butylaniline, p-butoxybenzylidene-p-n-propylaniline, p-hexyloxybenzylidene-p-toluidine, p-pentyloxybenzylidene-p-toluidine, p-heptyloxybenzylidene-p-acetoxyaniline, 4-methoxy-4'-butylazoxybenzene, 4-butyl-4'-methoxyazoxybenzene, ethoxybenzylidene-p-n-hexylaniline (EBHA), etc.

Generally, a single liquid crystal compound has a high liquid crystal temperature or a narrow range of liquid crystal temperature. For example, a range of MBBA liquid crystal temperature is +21° C to +45° C, that of EBBA liquid crystal temperature is +36° C to +78° C, and that of EBHA liquid crystal temperature is +37° C to +76° C. Usually, a liquid crystal temperature is lowered by mixing two or more of these liquid crystal compounds. For example, a range of liquid crystal temperature is −15° C to +50° C for a 50 : 50 (ratio by weight) mixture of MBBA and EBBA and +10° C to +47° C for a 80 : 20 mixture thereof, −10° C to +56° C for a 50 : 45 : 5 (ratio by weight) mixture of MBBA, EBBA and methylbenzylidene-butylaniline, −10° C to +48° C for a 60 : 40 (ratio by weight) mixture of MBBA and EBBA, and −8° C to +75° C for a 50 : 50 mixture thereof.

According to the present invention, an onium halide salt having a nitrogen atom as a nucleus and having a molecular weight of 110 to 2,100 is added to said single or mixed nematic liquid crystals as an ionic substance, based on the weight of the nematic liquid crystal compound, in an amount of at least 0.001% by weight but smaller than the solubility limit thereof in the liquid crystal in the presence of a phenolic compound. Preferably, the amount of the onium halide salt should be less than about 3% by weight. The onium halide salts may include quaternary ammonium halides, pyridinium halides, isoquinolinium halides, quinolinium halides and acridinium halides. For example, the ammonium halides include hexadecyltrimethylammonium bromide, ethylhexadecyldimethylammonium bromide, phenylbenzyldimethylammonium chloride, phenyltrimethylammonium bromide, phenyltrimethylammonium triiodide, 4-n-butylphenyltrimethylammonium triiodide, hexadecyltrimethylammonium triiodide, tetramethylammonium dichloroiodide, tetramethylammonium diiodide bromide, tetramethylammonium tetraiodide chloride, tetramethylammonium tetraiodide, etc.

The pyridinium halides include 1-hexadecylpyridinium chloride, 1-hexadecylpyridinium bromide, 1,1'-ethylenebispyridinium bromide, 1-hexadecyl-pyridinium triiodide, 1-dodecylpyridinium triiodide, 1-methylpyridinium triiodide, etc.

The isoquinolinium halides include 2-hexadecylisoquinolinium triiodide, 2-methylisoquinolinium triiodide, etc.

The acridinium halides include 10-methylacridinium chloride, 10-methylacridinium bromide, 10-methylacridinium triiodide, etc.

The foregoing halides can be represented by the following general formulas.

1. Quaternary ammonium halides (their molecular weights are about 110 to 2,100, particularly not more than 1,200):

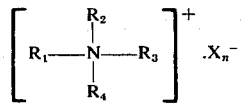

wherein $R_1$, $R_2$, $R_3$ and $R_4$ represent phenyl groups, or alkyl or aralkyl groups having not more than 20 carbon atoms, particularly not more than 9 carbon atoms, X halogen atoms selected from bromine, iodine and chlorine atoms, and $n$ is an integer of 1, 3 or 5.

2. Pyridinium halides (their molecular weights are about 130 to 1,350, particularly not more than 1,100):

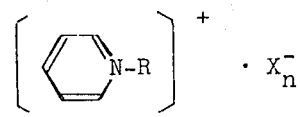

wherein R represents a phenyl group, or alkyl or aralkyl group having not more than 20 carbon atoms, particularly not more than 9 carbon atoms, X halogen atoms selected from bromine, iodine and chlorine atoms, and $n$ an integer of 1, 3 or 5.

3. Isoquinolinium halides (their molecular weights are about 180 to 1,130, particularly not more than 900):

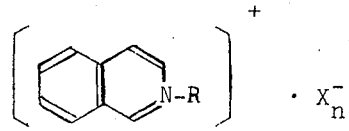

wherein R, X and $n$ have the same meanings as defined in the foregoing item 2).

4. Quinolinium halides

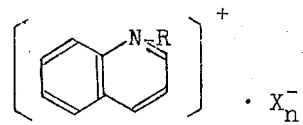

wherein R, X and $n$ have the same meanings as defined in the foregoing item 2).

5. Acrilidinium halides (their molecular weights are about 230 to 1,170, particularly not more than 940).

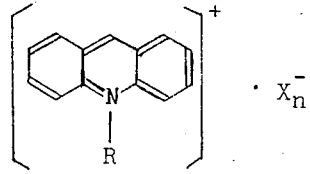

wherein R, X and n have the same meanings as defined in the foregoing item 2).

When less than 0.001% by weight of the onium salt is added to the liquid crystals, the salt acts insufficiently as an ion source, and has insufficient effect upon the improvement of the response. On the other hand, when an amount of the solubility limit of the salt is added to the liquid crystals, the salt precipitates, resulting in that the electrooptical characteristics of the display device are deteriorated. Any combination of said ionic substance with the liquid crystals can be selected freely, but a combination of mutually inert compounds can bring about a more preferable result.

In view of the stability of the liquid crystal composition, which stability may be affected by electrochemical reactions among the ingredients contained in the composition, the salts having an aromatic nucleus or nuclei are preferably used. Particularly, acridinium salts and isoquinolinium salts mentioned hereinbefore have excellent properties, because they are electrochemically inert to the liquid crystal compounds and other ingredients. The phenolic compounds serve to improve the solubility of the onium halide salts in the liquid crystals so that the resulting liquid crystal compositions become stabilized over the wide range of ambient temperatures, because precipitation of the onium halide salts is suppressed by the effect of the phenolic compounds. Further, the added phenolic compound assists dissociation of the onium halide salts in the liquid crystals to ions, so that response of the liquid crystal composition to the applied voltage is increased. There are the important advantages of the inventive liquid crystal compositions that a threshold voltage thereof is considerably lowered and, furthermore, the threshold voltage is not changed with an ambient temperature change. According to a number of experiments conducted by the present inventors, an addition of either the onium halide salt or the phenolic compound cannot attain the above mentioned advantages.

Since an additive amount of the onium halide salt is changed in accordance with the conformation of the display device, the driving manner, the number of display digits, etc., an amount of the phenolic compound is determined in accordance with the amount of the onium halide salt added. For example, when 0.001 to 0.1% by weight of the onium halide salt is added to the liquid crystal the phenolic compound of about one to 50 times by weight that of the onium halide salt is added. When more than 0.1% to 0.6%, especially 0.1 to 0.5% by weight of the onium halide salt is added, the phenolic compound of about 0.5 to ten times, especially 0.5 to 5 times that of the onium halide salt is added. Further, when more than 0.6% to 3% by weight of the onium salt is added, an amount of the phenolic compound is about 0.5 to two times that of the onium salt. In general, an additive amount of the onium halide salt is 0.001 to 3% by weight, based on the liquid crystal and an amount of the phenolic compound is about 0.5 to 50 times that of the onium halide salt, but the amount of the latter does not exceed about 6% by weight, based on the liquid crystal.

The typical phenolic compounds used in the present invention include the following compounds:

1. Phenol and alkyl substituted phenols represented by the formula:

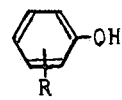

R: H or an alkyl group having 1–14 carbon atoms.
Phenol, cresol, octylphenol, nonylphenol, dodecylphenol, etc.

2. Halogenated phenols represented by the formula:

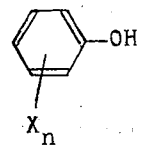

X: halogen atom (Cl, Br, I)
n: 1 to 3
Monochlorophenol, dichlorophenol, trichlorophenol, monobromophenol, etc.

3. Alkoxy substituted phenols represented by the formula:

R: an alkyl group having 1–14 carbon atoms.
P-methorylphenol, p-ethorylphenol, etc.

4. Acyl substituted phenols represented by the formula:

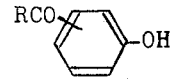

R: an alkyl group having 1–14 carbon atoms.
Acetylphenol, butyryl phenol, hexanoylphenol, etc.

5. Aminophenols represented by the formula:

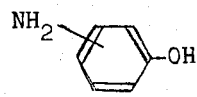

P-aminophenol, m-aminophenol, etc.

6. Nitrophenols represented by the formula:

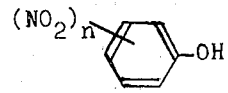

n: 1 to 2
P-nitrophenol, 3,5-dinitrophenol, etc.

7. Methyl aminophenols

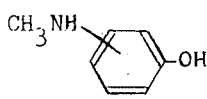

P-methylaminophenol, etc.
8. Cyanophenols

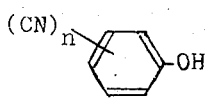

n: 1 to 2
P-cyanophenol, 2,6-dicyanophenol, etc.
9. Hydroquinon monobenzyl ether

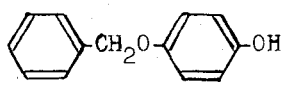

10. P-phenylphenol

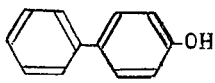

11. Benzoxyphenol

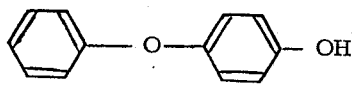

The phenolic compounds used in the present invention should have a molecular weight of 94 to about 500. If the phenolic compounds have a molecular weight larger than 500, they are not suitable because of their poor solubility in the liquid crystal. Further, the number of an OH group in the molecule of the phenolic compound should be less than two. If the phenolic compounds possess more than two OH groups in the molecule, the solubility thereof in the liquid crystal would be drastically decreased.

Thus, the phenolic compound used in the present invention is preferably a member selected from the group consisting of phenol, alkylphenols having a molecular weight of 108 to 290, benzoxyphenol, halogenated phenols having a molecular weight of 127 to 472, alkoxy substituted phenols having a molecular weight of 124 to 306, acyl substituted phenols having a molecular weight of 136 to 318, aminophenol, nitrophenols having a molecular weight of 139 to 185, methylaminophenol, cyanophenols having a molecular weight of 115 to 141, hydroquinone monobenzyl ether, p-phenylphenol and combinations thereof.

When less than 0.001% by weight of the phenol is added, a satisfactory effect of the addition cannot be obtained. On the other hand, when more than 6% by weight of the phenols is added, the upper limit of the mesomorphic temperature of the liquid crystal composition would be lowered.

Now, the present invention will be described in detail by way of Examples.

EXPERIMENTAL EXAMPLE 1

Figure 2:
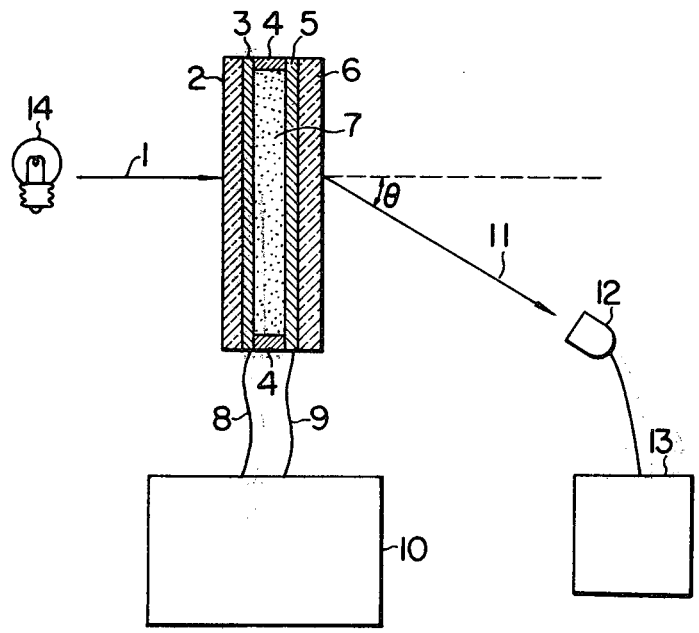
FIG. 2 is a schematic view of an apparatus for measuring a scattered light intensity and a response time of a liquid crystal composition.

An experimental apparatus of FIG. 2 was built up, using a liquid crystal composition of the present invention.

In FIG. 2, a thin layer 7 of the liquid crystal composition is interposed between transparent glass plates 2, 6, whose inner sides are coated with transparent tin oxide films (nesa films) 3 and 5, respectively, and sealed at both ends with spacers 4. A light beam 1 emitted from a light source 14 is irradiated in one direction of the glass of the display element, and a light receiver 12 positioned at an angle $\theta$ from the light axis receives scattered light 11, and a photometer 13 measures its output.

Further, the nesa films 3 and 5 are connected to a power source 10 through lead wires 8 and 9, respectively.

The foregoing structure of the display element is destined for the experimental apparatus, and the well known element structures are, of course, applied to table-type electronic computers, watches, etc. respectively.

Phenols shown in Table 1 were added to mixtures of methoxybenzylidene-p-n-butylaniline and ethoxybenzylidene-p-n-butylaniline in a ratio of 1 : 1 by weight, and further 0.1% by weight of tetra-n-butylammonium bromide was added thereto as an organic quaternary ammonium salt. The resulting mixture was stirred at 50° C until the additives were completely dissolved in the liquid crystal compounds. The resulting liquid crystal composition 7 was interposed between two glass plates 2 and 6 having a dimension of 40 mm × 50 mm × 3 mm, whose inner sides were coated with transparent tin oxide electro-conductive films 3 and 5 by a spray process, using polyester films having a thickness of 9 μm as spacers 4 to build up a kind of transmission type display element. Bi-directional pulse voltage having a pulse width of 2ms and a duty ratio of ⅛ and wave form, as shown in FIG. 1 was applied to the display element, using a pulse voltage generator 10. Dependability of scattered light intensity upon voltage and response time (time from initiation of application of pulse voltage till the scattered light intensity reaches 90% of saturation value) were measured using the optical system as illustrated in FIG. 2. The scattered light intensity and response time are shown in Table 1 for an applied voltage of 24V. For comparison, Comparative Example 1, where no ionic substances were contained, and Comparative Example 2, where only the quaternary ammonium salt was contained, are shown in Table 1.

Figure 3:
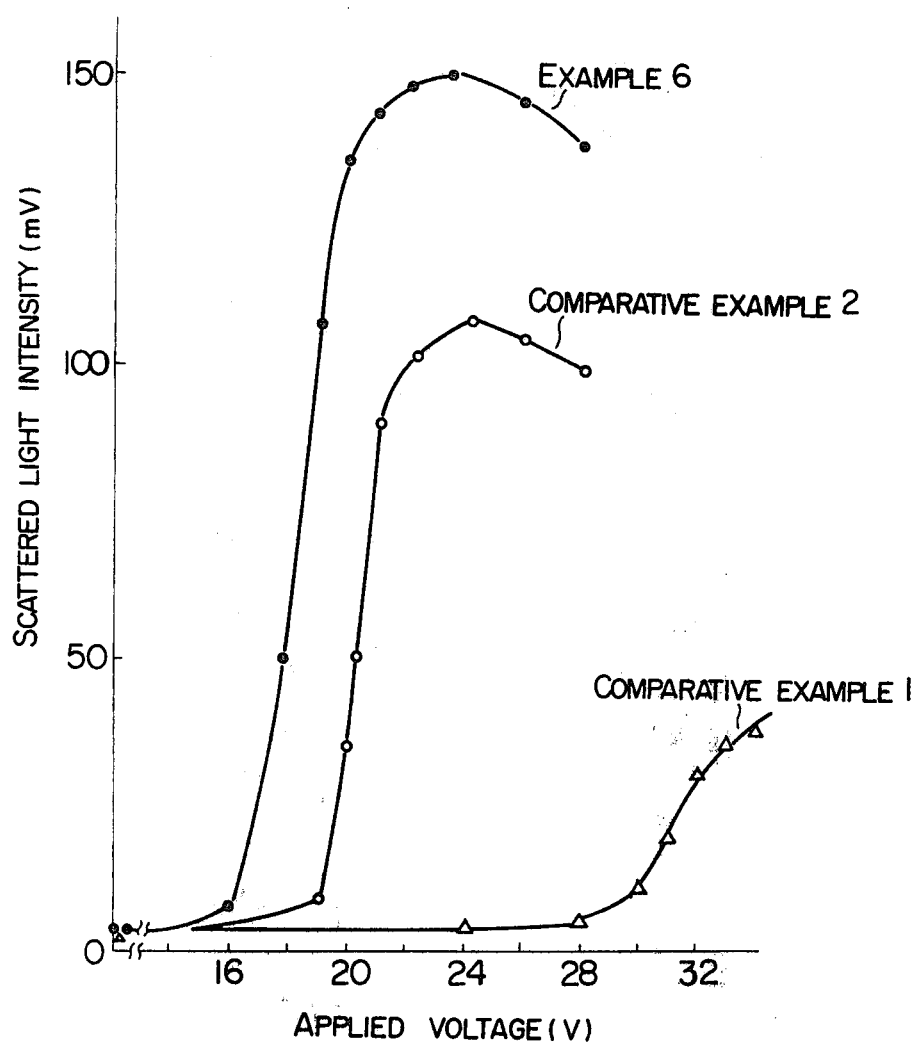
FIG. 3 is a diagram showing relations between applied voltage and scattered light intensities of liquid crystal compositions.

As is apparent from Table 1, the liquid crystal compositions of the present invention show good scattered light intensities and quick responses with intermittent applied voltages of small pulse width such as 2 m sec and ⅛ duty, as compared with the comparative examples. Curves of scattered light intensities versus voltages are shown in FIG. 3 for Example 1 and Comparative Examples 1 and 2. As apparent from FIG. 3, Example 6 has a low threshold voltage, as compared with Comparative Examples 1 and 2.

Table 1

| Examples | Additive (% by weight) | | Scattered light intensity (mV) | Response time (m sec) |
|---|---|---|---|---|
| | Onium halide salt | Phenols | | |
| Comp. Ex. 1 | — | — | 2 | no response |
| Comp. Ex. 2 | Tetra-n-butylammonium bromide (0.1) | — | 50 | 1200 |
| Ex. 1 | " | p-phenylphenol (0.3) | 130 | 400 |
| Ex. 2 | " | p-n-nonylphenol (0.3) | 112 | 200 |
| Ex. 3 | " | p-benzyloxyphenol (0.3) | 130 | 270 |
| Ex. 4 | " | p-cresol (0.3) | 150 | 300 |
| Ex. 5 | " | 2,6-dichlorophenol (0.3) | 136 | 250 |
| Ex. 6 | " | p-aminophenol (0.3) | 150 | 340 |
| Ex. 7 | " | p-nitrophenol (0.3) | 146 | 600 |

Note) Scattered light intensity and response time are all for application of 24 V.

EXPERIMENTAL EXAMPLE 2

A liquid crystal mixture of methoxybenzylidene-p-n-butylaniline and ethoxybenzylidene-p-n-butylaniline in a ratio of 1 : 1 by weight was admixed with hexadecyltrimethylammonium bromide as an organic quaternary ammonium salt singly or further with p-aminophenol as shown in Table 2, and electroconductivities of the resulting systems were compared. It was found that the systems containing p-aminophenol had an increased electroconductivity. That is to say, it is seen that solubility and dissociation of the ammonium salt in the liquid crystal compounds is increased by the addition of the phenolic compound.

Table 2

| Example | Additive (% by weight) | | Electroconductivity ($\Omega^{-1}$ m$^{-1}$) |
|---|---|---|---|
| | Onium halide salt | Phenols | |
| Comp. Ex. 3 | — | — | $8 \times 10^{-13}$ |
| Comp. Ex. 4 | Hexadecyltrimethylammonium bromide (0.15) | — | $3.8 \times 10^{-11}$ |
| Comp. Ex. 5 | Hexadecyltrimethylammonium bromide (0.25) | — | $6.6 \times 10^{-11}$ |
| Ex. 8 | Hexadecyltrimethylammonium bromide (0.15) | p-aminophenol (0.3) | $1.5 \times 10^{-10}$ |
| Ex. 9 | Hexadecyltrimethylammonium bromide (0.25) | p-aminophenyl (0.3) | $2.0 \times 10^{-10}$ |

As is apparent from Table 2, the liquid crystal compositions of the present invention have good electro-optical characteristics, especially good response to application of intermittent pulse voltage of small pulse width, as compared with the comparative liquid crystal materials, and when the present liquid crystal composition is used as materials for liquid crystal display, a multiplexing driving with high reliability, which has been so far regarded as very difficult, can be carried out in a simple, low cost circuit.

EXPERIMENTAL EXAMPLE 3

To a liquid crystal mixture of methoxybenzylidene p-butylaniline and ethoxybenzylidene p-hexylaniline in a ratio of 3 : 2 by weight were added a pyridinium salt as an ion source and phenols shown in Table 3. Scattered light intensity and response time were measured in the same manner as in Experimental Example 1. The results are shown in Table 3.

Table 3

| Example | Additive (% by weight) | | Scattered light intensity (mV) | Response time (m sec) |
|---|---|---|---|---|
| | Onium halide salt | Phenols | | |
| Comp. Ex. 6 | — | — | 2 | No response |
| Comp. Ex. 7 | 1-hexadecylpyridinim bromide (0.1) | — | 10 | More than 1 sec (700 ns at 40V) |
| Comp. Ex. 8 | — | p-phenylphenol (0.5) | 3 | no response |
| Ex. 10 | 1-hexadecylpyridinium bromide (0.1) | p-n-nonylphenol (0.5) | 24 | 500 at 40V |
| Ex. 11 | " | p-aminophenol (0.5) | 25 | 400 at 40V |
| Ex. 12 | " | p-nitrophenol (0.5) | 20 | 300 at 40V |
| Ex. 13 | " | p-phenylphenol (0.5) | 25 | 500 at 40V |

EXPERIMENTAL EXAMPLE 4

A liquid crystal mixture of methoxybenzylidenep-butylaniline and ethoxybenzylidene-p-hexylaniline in a ratio of 1 : 1 by weight was admixed with an onium salt, or phenolic compound or both, and scattered light intensity and response time were measured in the same manner as in Experimental Example 1.

The results, that is, especially the effect of a combination of the onium salt and the phenolic compound, are shown in Table 4.

Table 4

| Example | Additive (% by weight) | | Scattered light intensity (mV) | Response time (m sec) |
|---|---|---|---|---|
| | Onium salt | Phenols | | |
| Comp. Ex. 9 | — | p-phenylphenol (0.5) | 3 | No response |
| Comp. Ex. 10 | dodecylquinolinium bromide (0.1) | — | 20 | More than 1 sec |

Table 4-continued

| Example | Additive (% by weight) | | Scattered light intensity (mV) | Response time (m sec) |
| --- | --- | --- | --- | --- |
| | Onium salt | Phenols | | |
| Ex. 14 | ″ | p-phenylphenol (0.5) | 40 | 600 at 30V |
| Ex. 15 | ″ | p-n-nonylphenol (0.5) | 40 | 600 at 30V |
| Ex. 16 | ″ | p-aminophenol (0.5) | 45 | 500 at 30V |
| Ex. 17 | ″ | p-nitrophenol (0.5) | 43 | 400 at 30V |

EXPERIMENTAL EXAMPLE 5

A liquid crystal compound, methoxybenzylidenep-butylaniline was admixed with 0.1% by weight of tetran-butylammonium bromide as an onium halide salt, and 0.5% by weight of a phenolic compound listed in Table 5, and threshold voltage, scattered light intensity and response time were measured in the same manner as in Experimental Example 1. The results are given in Table 5.

Table 5

| Example | Phenols (0.5% by weight) | Vth (V) | Scattered light intensity (mV at 25V) | Response time (m sec at 25V) |
| --- | --- | --- | --- | --- |
| Ex. 14 | Hydroquinone monobenzylether | 19.5 | 130 | 200 |
| Ex. 15 | p-cresol | 22 | 70 | 400 |
| Ex. 16 | 2,6-dichlorophenol | 21 | 100 | 400 |
| Ex. 17 | 2,4,6-trichloro-phenol | 22 | 70 | 530 |
| Ex. 18 | 2,4-dinitro-1-naphthol | 23 | 60 | 650 |
| Ex. 19 | Phenolphthalein | 23 | 60 | 400 |
| Ex. 20 | 3-nitrophenol | 25 | 30 | 800 |
| Ex. 21 | 2,6-dinitrophenol | 18 | 90 | 300 |
| Ex. 22 | p-ethoxyphenol | 23 | 40 | 500 |
| Ex. 23 | p-acetylphenol | 20 | 70 | 600 |
| Ex. 24 | 2-hydroxypyridine | 22 | 60 | 600 |

EXPERIMENTAL EXAMPLE 6

To a 1 : 1 molar ratio mixture of MBBA and EBBA were added dodecylquinolinium bromide (CS-14) and phenols in amounts shown in Table 6. The scattered light intensity and response time with respect to the inventive liquid crystal compositions and comparative compositions are given in Table 6.

Table 6

| Example | CS-14 | Phenol | Scattered light intensity (mV) | Response time (m sec) |
| --- | --- | --- | --- | --- |
| Comp. Ex. 11 | 0.1 wt% | — | 22 | >1000 |
| Ex. 25 | ″ | p-phenylphenol 0.5 wt% | 40 | 600* |
| Ex. 26 | ″ | p-n-nonylphenol 0.5 wt% | 40 | 600* |
| Ex. 27 | ″ | p-aminophenol 0.5 wt% | 45 | 500** |
| Ex. 28 | ″ | p-nitrophenol 0.5 wt% | 45 | 400** |

*Response times were measured at an applied voltage of 30 volts.
**Response times were measured at an applied voltage of 24 volts.

EXPERIMENTAL EXAMPLE 7

To a 60 : 40 molar ratio mixture of MBBA and EBHA were added acrilidinium monobromide (CS-11) and phenols shown in Table 7. The scattered light intensity and response time are given in Table 7.

Table 7

| Example | CS-11 | Phenol | Scattered light intensity (m v) | Response time (m sec) |
| --- | --- | --- | --- | --- |
| Comp. Ex. 12 | — | — | not scattered | no response |
| Comp. Ex. 13 | 0.1 wt% | — | 10 | >1000 |
| Ex. 29 | ″ | p-phenylphenol | 20 | 700 |
| Ex. 30 | ″ | p-aminophenol | 24 | 700 |
| Ex. 31 | ″ | p-nitrophenol | 20 | 600 |

Response time was measured at an applied voltage of 30 volts.

In the foregoing, explanation has been made of the liquid crystal composition consisting of a liquid crystal compound, an onium halide salt and a phenolic compound, but a small amount of a chloresteric compound as disclosed by the present inventors in U.S. Patent Application Ser. No. 444532, filed on Feb. 21, 1974, titled "Nematic Liquid Crystal Composition" can be added to the ternary system to prolong the rise time of dynamic scattering effect of a liquid crystal composition. Furthermore, it is obvious that a compound well known in the relevant field can be added to the ternary system in such a range as not to deteriorate the characteristics of the liquid crystal composition.

In the foregoing examples, dynamic characteristics of liquid crystals by intermittent pulses have been taken into account. This means that the poor driving conditions in multiplexing driving have been especially taken into account.

Now, characteristics of liquid crystal materials of the present invention under the actual multiplexing driving conditions will be hereunder described, and differences from the liquid crystal materials directed to the conventional static driving, and differences from the conventional multiplexing driving will be also shown.

Figure 4A:
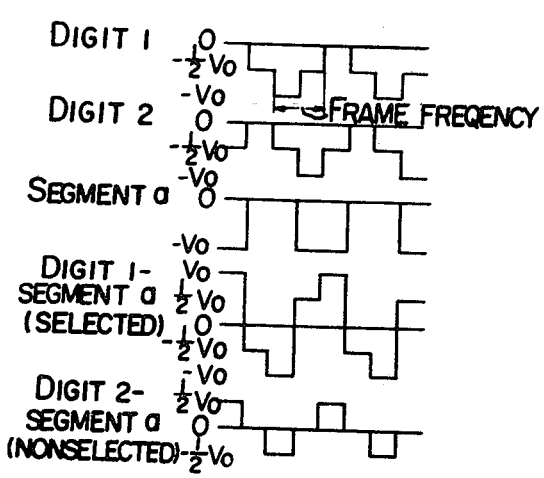
FIG. 4a shows driving wave forms of ½ bias, ½ duty ratio multiplexing of a matrix display of which diagram is shown in FIG. 4b.

FIG. 4a shows one example of a driving wave form by the voltage-averaging method, the most basic system of a wide application field among various systems for multiplexing driving. The present inventors have come to know the following fact. That is, materials which are easy to be driven by intermittent pulses also have a very good operating characteristic even in actual multiplexing driving. Further detailed study has revealed that such materials suitable for multiplexing driving meet the following two important principles.

Principle 1: Lighting threshold voltage (Vth) of liquid crystals at alternate current driving in a low frequency region is constant, independently of the wave form of applied voltage, when arranged from the standpoint of effective values.

Principle 2: In a low frequency region when lighting threshold voltage (Vth) is not changed by frequency (0.1 to several kHz), brightness of a liquid crystal display device depends upon the effective value of applied signal.

When these two principles are valid, an operating voltage range of the materials can be theoretically clearly analyzed. Now, symbols are defined as follows:

$V_o$: Peak voltage of driving signal when selected.

$V_{th}$: Threshold voltage ($V_{rms}$) at dynamic scattering $V_{s1}$: Signal voltage ($V_{rms}$) at selected segment $V_{s2}$: Signal voltage ($V_{rms}$) at semi-selected segment (non-selected segment)

Figure 4B:
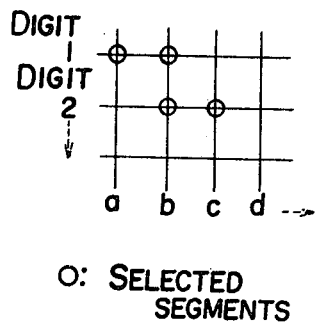

$V_{th1}$: Threshold voltage at selected segment in terms of $V_o$ $V_{th2}$: Threshold voltage at semi-selected segment (non-selected segment) in terms of $V_o$ When the liquid crystal display device is driven by the voltage-averaging method (a case of ½ bias method will be hereinafter described; cases of ⅓ bias and ¼ bias methods are similar to the case of ½ bias method), it is theoretically clear as to signal wave form applied to liquid crystals at segments that the effective voltages applied to the selected segments and semi-selected segment(nonselected segments) of FIG. 4b are individually constant for any display pattern.

In the case of ½ bias method, $$V_{s1} = \tfrac{1}{2} V_o \sqrt{1 + 3/N} \qquad (1)$$

$$V_{s2} = \tfrac{1}{2} V_o \sqrt{1 - 1/N} \qquad (2)$$

N: Number of digits scanned

Thus, in a relation:

$$V_{s2} \leqq V_{th} \leqq S_{s1} \qquad (3)$$

Cross-talks are prevented and only the selected segments can be lighted in the liquid crystal display device. When an applied voltage ($V_o$) to the selected segment corresponds to the state of threshold value at the selected segments, there will be established such a relation as $V_{s1} = V_{th}$. By inserting this relation into equation (1), a threshold voltage $V_{th1}$ in terms of $V_o$ (a value of $V_o$ when such a relation as $V_{s1} = V_{th}$ is established) will be:

$$V_{th1} = 2 V_{th} \sqrt{\frac{N}{N+3}} \qquad (4)$$

Likewise, when the applied voltage ($V_o$) at semi-selected segments (not-selected segments) is a value corresponding to the state of threshold value, there is established such a relation as $V_{s2} = V_{th}$. By inserting this relation into equation (2), a threshold voltage $V_{th2}$ of semi-selected segments (nonselected segments) in terms of $V_o$ (a value of $V_o$ when there is established such a relation as $V_{s2} = V_{th}$) will be:

$$V_{th2} = 2 V_{th} \sqrt{\frac{N}{N+1}} \qquad (5)$$

Thus, when a range of $V_o$ free from crosstalks is presumed to be an operating voltage range, the following relation will be derived from (3), (4) and (5):

$$V_{th1} \leqq V_o \leqq V_{th2}$$

That is, there will be established such a relation as:

$$2 V_{th} \sqrt{\frac{N}{N+3}} \leqq V_o \leqq 2 V_{th} \sqrt{\frac{N}{N-1}} \qquad (6)$$

This is a basic formula for determining the operating voltage range. That is to say, the operating voltage of liquid crystals must be between the threshold voltage $V_{th1}$ at the selected segments and the threshold voltage $V_{th2}$ of the semi-selected segments (non-selected segments).

Now, an operating allowance $\alpha$ is defined as follows:

$$\alpha = V_{th2}/V_{th1} = \sqrt{\frac{N+3}{N-1}} \qquad (7)$$

By inserting N=2 (a case of ½ duty ratio) in (7), $$\alpha = \sqrt{5} \doteqdot 2.24.$$

When mass-producible devices are actually built by combining liquid display elements with large scale integrated circuits (LSI), the operating allowance will be much smaller, because of fluctuating factors originating from the circuit. The fluctuating factors originating from the circuit are, for the most part, fluctuation in power source voltage (for example, voltages of individual LSIs are fluctuated when LSIs are mass-produced), and voltage drop due to external resistance of LSI. For example, when a driving voltage is $V_o$, and its differential of fluctuation is $\Delta V_o$, $$\Delta V_o/V_o = 0.1$$

When a voltage drop is −15%, an allowable percent fluctuation of $V_{th}$ will be about 20%. That is to say, $\alpha =$ about 1.6.

Now, a case, where the foregoing analysis is applied to liquid crystal materials of the present invention, will be described.

Figure 5:
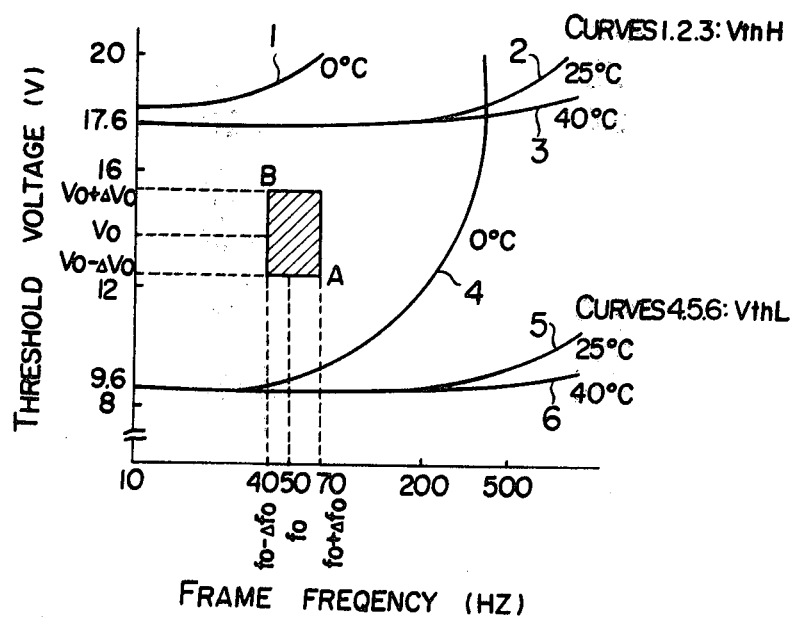

FIG. 4a shows a concrete example of wave form of multiplexing driving at ½ bias and ½ duty, and FIG. 5 shows relations between threshold values and frame frequency, when a liquid crystal material consisting of a liquid crystal mixture of MBBA and EBHA in a molar ratio of 3 : 2, 0.03% by weight of 1-hexadecyl-pyridinium bromide as an ionic additive, and further 1.0% by weight of p-aminophenol, based on the liquid crystal mixture, is driven in the driving form of FIG. 4a. That is to say, the frame frequency of the driving wave form is represented on the abscissa as a variable, and operating threshold values (in terms of $V_o$) are experimentally plotted on the ordinate for a semiselected (non-selected) segment case ($V_{thH}$ : threshold of OFF segments) and a selected segment case ($V_{thL}$ : threshold of ON segments). When the fluctuation in power source voltage is suppressed to $\Delta V_o/V_o \leqq 0.1$ and fluctuation in frame frequency is suppressed to $\Delta fo/fo$ 0.25, a region occupied by the fluctuation of the driving circuit will be a region of the circuit variation shown in FIG. 5, that is, the rectangular region. To assure normal operation of the liquid crystal display device, the curve of $V_{thL}$, $V_{thH}$ vs. frame frequency must never fall in said rectangular region in the necessary temperature range. Especially, the $V_{thL}$ curve is liable to approach point A in FIG. 5, and the $V_{thH}$ curve is liable to approach point B.

Therefore, it is necessary that liquid crystal materials to be used in such multiplexing driving have a sufficient flat region of $V_{th}$ at low frequencies in a broad temperature range, and are not fluctuated by temperature or other causes. For example, the $V_{th}$ value must be fluctuated by impurities mixed into the matrix liquid crystals or by-produced by deterioration appearing in the operation.

Addition of the binary system of ionic additive and phenolic compound of the present invention can satisfy such conditions as mentioned above, and offer distinguished superiority over the other conventional materials. FIG. 6 shows a liquid crystal mixture of MBBA and EBHA in a molar ratio of 1 : 1, containing only 0.3% by weight of tetra-n-butylammonium bromide, based on the liquid crystal mixture, where $V_{th}$ is greatly fluctuated by temperature, while the inventive composition showed smaller dependency of Vth L and Vth H upon a temperature change as can be seen from FIG. 5. When results of FIG. 6 are taken into FIG. 5, such materials as containing no phenolic compounds are very difficult for normal multiplexing driving. However, it has been confirmed by the present inventors that when 0.3% by weight of p-aminophenol is added to said material or to the same liquid crystal materials containing 0.1% by weight of tetra-n-butylammonium bromide as the ionic additive in place of 0.3% by weight, the resulting materials are applicable to multiplexing driving at ¼ duty ratio in a range of 0° to 40° C, because the temperature fluctuation of $V_{th}$ is much decreased by the addition of the phenolic compound.

As is obvious from said several examples, it is seen that the binary addition of the ionic additive and the phenolic compound can meet practically important conditions of multiplexing driving in a broad temperature range through an ability to stabilize the $V_{th}$.

In addition to the foregoing fact of $V_{th}$ stabilization, several merits are brought about by said binary addition. That is, in low temperature maintenance or low temperature operation (nearly 0° C), deposition of the ionic additive or crystallization of liquid crystal can be prevented by the addition of phenolic compound. Comparison was carried out to observe deposition of crystals in low temperature operation for cases where only the ionic additive were added to a matrix crystal mixture of MBBA and EBHA in a molar ratio of 3 : 2 and cases where p-aminophenol was further added thereto. The results are shown in Table 8.

Table 8

| Example | 1-hexapyridinium bromide (wt %) | p-phenol (wt%) | Deposition of foreign matters in 0°C operation |
|---|---|---|---|
| Ex. 32 | 0.03 | — | much deposition after 24 hr., visible |
| Ex. 33 | 0.1 | — | much deposition after 10 hr., visible |
| Ex. 34 | 0.03 | 1.0 | no deposition after 200 hr. |
| Ex. 35 | 0.1 | 1.0 | a little deposition after 10 hr. |

The operating conditions were $V_o = 15V$, ½ bias, ½ duty at 0° C (conditions of FIG. 4), and a 0.5V unbalance was added as a direct current component.

As is seen from the foregoing examples, the phenolic compounds can increase the solubility of the onium halide salt as neutral molecules in the liquid crystal, and further help to dissociate the onium halide salt dissolved as the neutral molecule, as ions. This is seen from an increase in impedance of liquid crystal containing the onium halide salt. These two facts or phenomena are obviously shown by reducing the amount of the onium halide salt to be added, and increasing the amount of the phenolic compound to be added, for example, by making their molar ratio about 1 : 60. That is to say, many various merits, such as stabilization of $V_{th}$, reliability of operation and maintenance at a low temperature, etc. can be assured by adding a sufficient amount of the phenolic compounds while using a smaller amount of the onium halide salt.

What is claimed is:

1. A nematic liquid crystal composition comprising:
   a predominant amount of an $N_n$-type nematic liquid crystal;
   an onium halide salt selected from the group consisting of quaternary ammonium halides, pyridinium halides, isoquinolinium halides, quniolinium halides, acrilidinium halides and combinations thereof, said onium halide salt being dissolved in the nematic liquid crystal for effecting a dynamic scattering mode of the liquid crystal compound upon application of a driving voltage; and
   a phenolic compound selected from the group consisting of phenol, alkylphenols having a molecular weight of 108 to 290, benzoxyphenol, halogenated phenols having a molecular weight of 127 to 472, alkoxy substituted phenols having a molecular weight of 124 to 306, acyl substituted phenols having a molecular weight of 136 to 318, aminophenol, nitrophenols having a molecular weight of 139 to 185, methylaminophenol, cyanophenols having a molecular weight of 115 to 141, hydroquinone monobenzyl ether, p-phenylphenol and combinations thereof, said phenolic compound being dissolved in the nematic liquid crystal for improving solubility of the onium salt in the liquid crystal compound and for improving dissociation of the onium salt in the liquid crystal compound to ions;
   the amount of the onium halide salt being 0.001 to 3% by weight, based on the weight of the liquid crystal composition, the phenolic compound being added to said composition in an amount of 0.5 to 50 times the amount of said onium halide salt, the amount of said phenolic compound in said composition being no larger than 6% by weight, based on the weight of the liquid crystal composition.

2. A nematic liquid crystal composition according to claim 1, wherein the amount of the onium halide salt is 0.001 to 0.1% by weight, based on the weight of the liquid crystal composition, and the amount of the phenolic compound is one to 50 times the amount of said onium halide salt.

3. A nematic liquid crystal composition according to claim 1, wherein the amount of the onium halide salt is more than 0.1% to 0.6% by weight, based on the weight of the liquid crystal composition, and the amount of the phenolic compound is 0.5 to ten times the amount of said onium halide salt.

4. A nematic liquid crystal composition according to claim 1, wherein the amount of the onium halide salt is more than 0.6%, to 3% by weight, based on the weight of the liquid crystal composition, and the amount of the phenolic compound is 0.5 to 2 times the amount of said onium halide salt.

5. A nematic liquid crystal composition according to claim 1, wherein the amount of the onium halide salt is 0.1 to 0.5% by weight, based on the weight of the liquid crystal composition, and the amount of the phenolic compound is 0.5 to 5 times the amount of the onium halide.

6. A nematic liquid crystal composition according to claim 1, wherein said onium halide salt is selected from the group consisting of 1. quaternary ammonium halides having a molecular weight of 110 to 2,100 and having the formula:

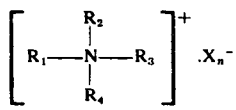

2. pyridinium halides having a molecular weight of 130 to 1,350 and having the formula:

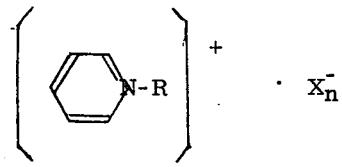

3. isoquinolinium halides having a molecular weight of 180 to 1,130 and having the formula:

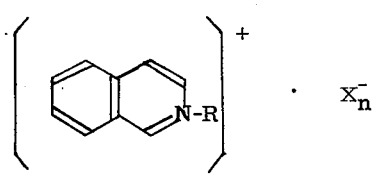

4. quinolinium halides having the formula:

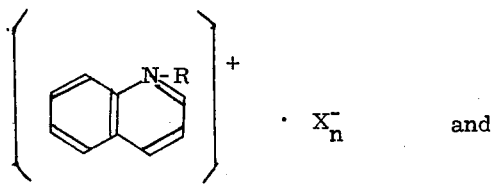

and 5. acrilidinium halides having molecular weights of 230 to 1,170 and having the formula:

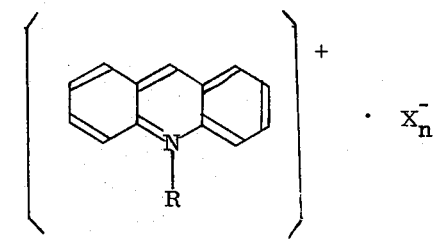

wherein R, $R_1$, $R_2$, $R_3$ and $R_4$ independently represent phenyl, alkyl having not more than 20 carbon atoms or aralkyl not having more than 20 carbon atoms, X is bromine, iodine or chlorine and $n$ is 1, 3 or 5.

7. A nematic liquid crystal composition according to claim 1, wherein the ingredients of said composition are mutually inert.

* * * * *